Figure 1:
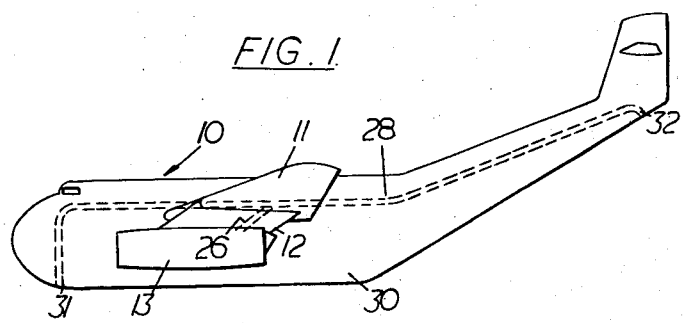

Dec. 31, 1963    G. L. WILDE ETAL    3,115,748
GAS TURBINE ENGINE

Filed May 3, 1961    5 Sheets-Sheet 1

Inventors
Geoffrey Light Wilde
Thomas Alfred Oldfield
By
Cushman, Darby & Cushman
Attorneys Dec. 31, 1963  G. L. WILDE ETAL  3,115,748
GAS TURBINE ENGINE Filed May 3, 1961  5 Sheets-Sheet 4

Dec. 31, 1963　　G. L. WILDE ETAL　　3,115,748
GAS TURBINE ENGINE

Filed May 3, 1961　　　　　　　　　　　5 Sheets-Sheet 5

Inventors
Geoffrey Light Wilde
Thomas Alfred Oldfield
By Cushman, Darby & Cushman
Attorneys

United States Patent Office 3,115,748
Patented Dec. 31, 1963

3,115,748
GAS TURBINE ENGINE
Geoffrey Light Wilde, Shottlegate, and Thomas Alfred Oldfield, Derby, England, assignors to Rolls-Royce Limited, Derby, England, a company of Great Britain
Filed May 3, 1961, Ser. No. 107,364
Claims priority, application Great Britain May 6, 1960
11 Claims. (Cl. 60—35.54)

This invention concerns gas turbine engines of the by-pass type, that is to say gas turbine engines in which a portion of the air compressed by the compressor means of the engine is supplied to a by-pass passage so as to by-pass the combustion equipment and turbine means of the engine, the air flowing through the by-pass passage being introduced into the jet pipe so as to mix with the jet gases therein.

According to the present invention there is provided a by-pass gas turbine engine having mixing means by which the by-pass air is mixed with the jet gases prior to their exit through the jet nozzle of the engine, a valve mechanism being provided which is associated with said mixing means, said valve mechanism being operable selectively to divert at least a proportion of the by-pass air into an ancillary air conduit for supplying air for ancillary purposes.

The "ancillary purposes" for which the air supplied to the said conduit may be used include its use in connection with control and stability air jets, blown flap arrangements, and the driving of auxiliaries such as air-turbine driven generators.

In its preferred form, the invention comprises a by-pass gas turbine engine comprising a by-pass passage, mixing means arranged to deliver air from the by-pass passage to the engine jet pipe so as to mix with the jet gases therein, an ancillary air conduit which is adapted to be supplied with air from the by-pass passage, a valve mechanism for controlling communication between the by-pass passage and said mixing means and for controlling communication between the by-pass passage and the ancillary air conduit, and means for moving the said valve mechanism between a first position in which the valve mechanism blanks off the ancillary air conduit from the by-pass passage but opens the mixing means to the full flow of air passing through the by-pass passage, and a second position in which the ancillary air conduit is opened to the by-pass passage while communication between said mixing means and the by-pass is restricted.

Preferably the downstream end of the jet pipe is provided with a variable area propulsion nozzle and means are provided for reducing the effective area of the variable area nozzle when the said valve mechanism is moved to its said second position.

Preferably the gas turbine engine is a forward propulsion engine which is provided with a jet deflector which is movable between an inoperative position and an operative position in which it deflects the jet gases downwardly.

The variable area nozzle may comprise at least one pivotally mounted flap, a cam for effecting pivotal movement of the flap, and means for effecting simultaneous movement of said cam and said valve mechanism. The jet deflector may comprise a part-cylindrical member.

The valve mechanism may comprise flap valves which are movable between a first position in which they block the ancillary air conduit and a second position in which they block part of the said mixing means. Preferably, however, the valve mechanism comprises an annular member which carries a plurality of angularly spaced apart obturating members and which is provided with an aperture between each adjacent pair of obturating members, said mixing means and said ancillary air conduit each comprising a corresponding plurality of angularly spaced apart passages, the annular member being movable between a first position in which the apertures are out of alignment with the passages of the ancillary air conduit and the obturating members permit full flow through the mixing means, and a second position in which the apertures are aligned with the passages of the ancillary air conduit and the obturating members restrict flow through the mixing means.

The invention also comprises an aircraft provided with at least one gas turbine engine as set forth above, the said ancillary air conduit preferably being arranged to supply control air to attitude control nozzle means arranged at the front and rear of the fuselage of the aircraft.

Figure 2:
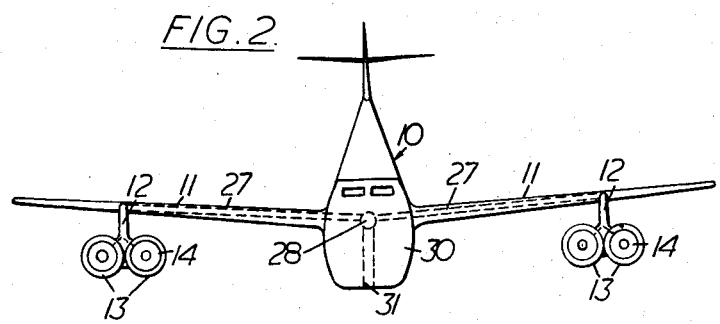
Figure 3:
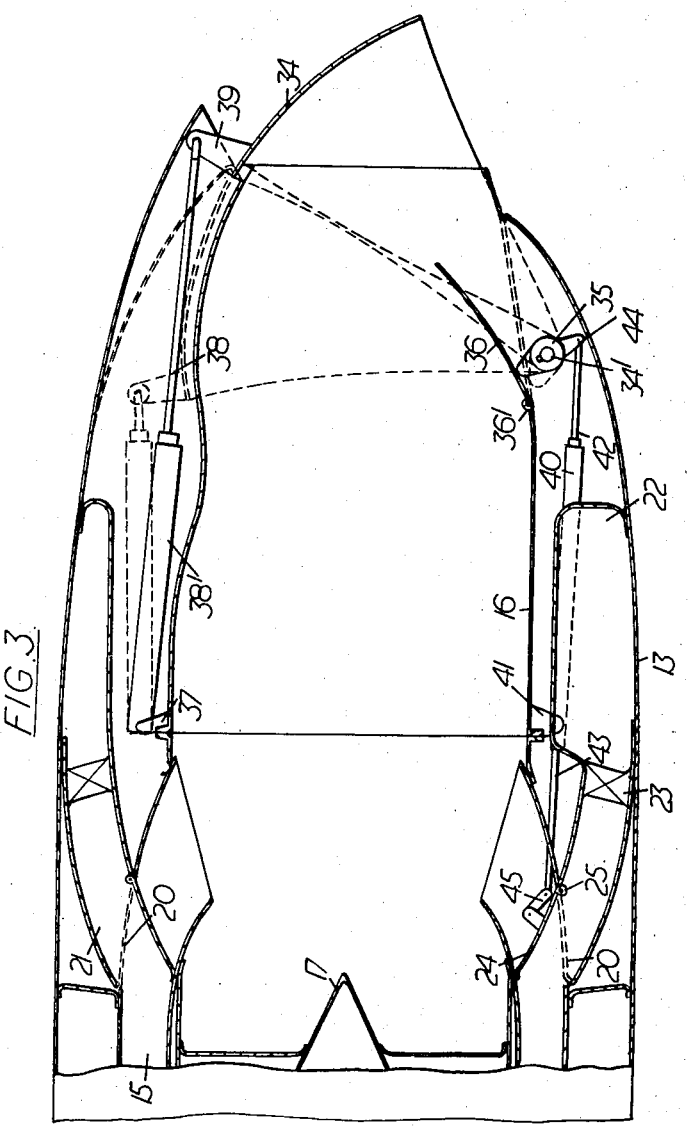
Figure 4:
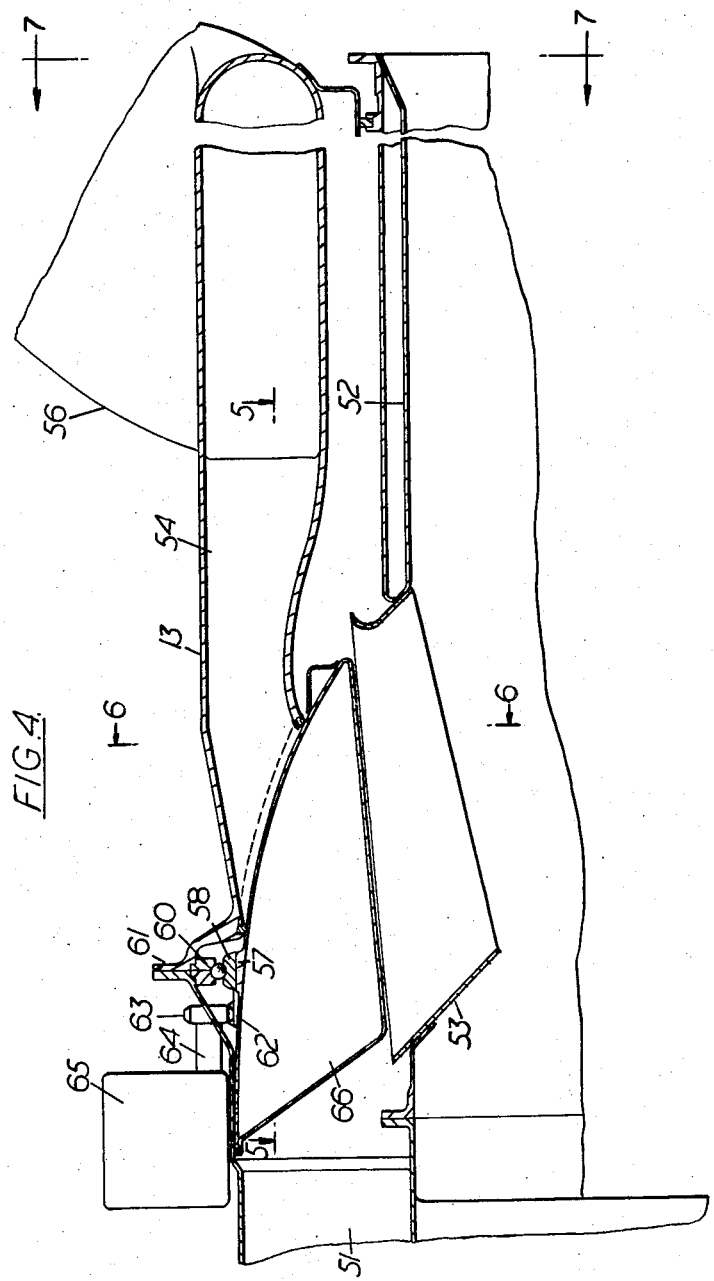

The invention is illustrated, merely by way of example in the accompanying drawings, in which:

FIGURES 1 and 2 are respectively a diagrammatic side view and a diagrammatic front view of an aircraft provided with gas turbine engines according to the present invention, FIGURE 3 is a broken away longitudinal section through one of the gas turbine engines of the aircraft of FIGURES 1 and 2, showing the part of the engine downstream of the turbine thereof, FIGURE 4 is a broken away longitudinal section through an alternative construction of gas turbine engine which may be used on the aircraft of FIGURES 1 and 2, and FIGURES 5 to 7 are sections taken respectively on the lines 5—5, 6—6 and 7—7 of FIGURE 4.

In FIGURES 1 and 2 there is shown an aircraft 10 each of whose wings 11 is provided with a downwardly extending support strut 12. Each of the struts 12 supports a pair of nacelles 13, a gas turbine, forward propulsion, jet reaction engine 14 being mounted within each nacelle 13.

Each engine 14 is of the by-pass type and (as shown in FIGURE 3) has an annular by-pass passage 15 which is arranged (by means not shown) to receive compressed air from the outlet of the low pressure compressor (not shown) of the engine. The downstream end of the by-pass passage 15 extends into the jet pipe 16 of the engine immediately downstream of a diffuser cone 17. The latter provides for the diffusion of the hot gases which have passed through the turbines (not shown) of the engine and these hot gases become mixed in the jet pipe 16 with the by-pass air which has been supplied to the jet pipe 16 through the passage 15.

The by-pass passage 15 communicates by way of apertures 20 with a series of angularly spaced apart conduits 21 leading to a volute 22. Each conduit 21 has a flow straightener 23 therein.

Each aperture 20 is adapted to be opened and closed by a flap valve 24 which is pivoted at 25, the various flap valves 24 being interconnected for movement in unison by means not shown. When the flap valves 24 are in the full line position shown in FIGURE 3, they extend into the by-pass passage 15 so as to restrict flow therethrough to the spaces between themselves. In the full line position, therefore by-pass air is supplied to the volute 22 and a reduced amount of by-pass air is supplied to the jet pipe 16. In the dotted line position shown in FIGURE 3, however, the flap valves 24 prevent any by-pass air from being supplied to the volute 22, all the by-pass air being supplied to the jet pipe 16.

The volute 22 of each engine 14 communicates (by means not shown) with a duct 26 (FIGURE 1) which is disposed within the respective strut 12. The ducts 26 communicate with ducts 27 (FIGURE 2) within the wings 11 and the ducts 27 lead to a passage 28 extending longitudinally of the fuselage 30 of the aircraft.

The fore and aft ends of the passage 28 extend downwardly to nozzles 31, 32 respectively on the underside of the fuselage 30. Thus air supplied to the volute 22 passes to the nozzles 31, 32 and so exerts vertical thrust at the forward and after ends of the fuselage, whereby to assist attitude control i.e. to assist in maintaining the aircraft in a desired flying attitude. Means (not shown) may be provided within the passage 28 for altering the relative amount of air supplied to the nozzles 31, 32 so as to enable the pilot to correct pitching.

A part-cylindrical jet deflector 34 is mounted at the downstream end of the jet pipe 16 and is supported on a fixed shaft 34' which is mounted within and transversely of the nacelle 13.

The shaft 34' supports a freely rotatable cam 35 which engages a flap 36 pivotally mounted at 36'. The flap 36 forms part of a variable area terminal nozzle.

An hydraulically or pneumatically operated ram 38' is pivotally mounted in brackets 37 mounted on the jet pipe 16, the ram having a rod 38 which is pivotally connected to brackets 39 carried by the jet deflector 34.

It will be seen therefore that by causing the piston (not shown) of the ram 38', and therefore the rod 38, to move to the right or left of the drawing, the jet deflector 34 and the ram will be moved into either the full or broken line positions shown in FIGURE 3 of the drawings.

A further hydraulically or pneumatically operated ram 40 is supported by the jet pipe 16 and is pivotally mounted in brackets 41.

The ram 40 has oppositely extending rods 42, 43 which are separate from each other but which are adapted to be moved simultaneously in opposite directions by hydraulic or pneumatic pressure fluid. The rod 42 is pivotally connected to brackets 44 carried by the cam 35, whilst the rod 43 is connected by a linkage, shown schematically at 45, to one of the flap valves 24.

As stated previously, all the flap valves 24 are interconnected so that, when the aforementioned flap valve 24 is moved by the rod 43, all the flap valves 24 are moved simultaneously.

At take-off, the ram 40 is actuated to place the flap valves 24 and the flap 36 into the full line position shown in FIGURE 3 of the drawings and the ram 38' is actuated to move the deflector 34 into the broken line position. The flap valves 24 will therefore allow some of the by-pass air from the by-pass passage 15 to pass to the nozzles 31, 32, a reduced amount of by-pass air in consequence being supplied to the jet pipe 16.

The flap 36 will however be in its minimum nozzle area position so as to compensate for the reduced mass flow caused by the fact that some of the by-pass air is being used for attitude control purposes.

When the aircraft reaches a predetermined speed during its take-off run and a predetermined lift force is being generated by its aerodynamic surfaces, the ram 38' is actuated so as to move the jet deflector 34 into the full line position of FIGURE 3 and so deflect the jet gases downwardly.

The downward deflection of the jet gases reduces the distance in which take-off of the aircraft is effected.

When the aircraft is air borne and its forward speed is sufficient to generate the required lift forces to maintain it in the air, the ram 38' is actuated so as gradually to return the jet deflector 34 to the broken line position shown in FIGURE 3 of the drawings in which it permits the jet gases to be discharged rearwardly.

Once the jet deflector 34 has attained the broken line position, the ram 40 is actuated so as to move the cam 35 into the broken line position, and during such movement the jet gases passing through the jet pipe 16 force the flap 36 into a position in which it lies against the wall of the jet pipe and therefore does not reduce the effective area thereof.

At the same time as the cam 35 is being moved to the broken line position the flap valves 24 are being moved to a position in which they seal the apertures 20 and permit the full flow of by-pass air to be supplied to the jet pipe 16. By-pass air will therefore no longer be supplied to the nozzles 31, 32, such air supply being unnecessary except at take-off.

Although the jet deflector 34 shown in FIGURE 3 is designed for short take-off, it will readily be appreciated that the jet deflector 34 may be replaced by a jet deflector which causes the jet gases to be deflected vertically downwardly whereby to permit vertical take-off. In the case of vertical take-off, about half the by-pass air needs to be supplied to the nozzles 31, 32. In the case of short take-off, however, the nozzles 31, 32 may be supplied with a much smaller proportion of the by-pass air.

Furthermore in the case of both short and vertical take-off aircraft the flap 36 may be dispensed with by making the construction of the jet deflector 34 and the nozzle such that, when the jet deflector is moved to deflect the gases downwardly, the outlet area of the nozzle is reduced to compensate for the reduced mass flow caused by the fact that some of the by-pass air is being used for attitude control purposes.

FIGURES 4 to 7 illustrate part of a gas turbine engine which may be used on the aircraft 10 in substitution for the engine shown in FIGURE 3.

The engine shown in FIGURE 4 comprises an annular by-pass passage 51 which is arranged to supply by-pass air to a jet pipe 52 so as to mix with the jet gases therein downstream of the turbines (not shown) of the engine. The by-pass passage 51 communicates with the jet pipe 52 by way of a series of angularly spaced apart stub pipes 53. The by-pass passage 51 is also arranged to supply by-pass air to a series of angularly spaced apart passages 54.

Figure 5:
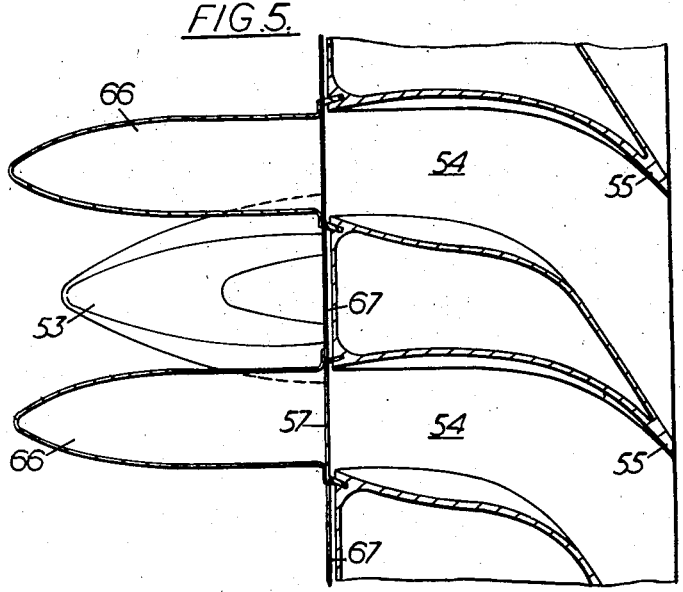

The width of the passages 54 gradually increases (as shown in FIGURE 5) with increasing distance from the by-pass passage 51 until adjacent passages 54 are separated from each other only by intervening walls 55. The passages 54 thus collectively constitute a volute assembly which is housed within the nacelle 13 and the air from which is supplied via conduits 56 (FIGURE 7) in the strut 12 to the nozzles 31, 32.

An annular sheet metal member 57, which is substantially part-spherical in shape, carries the inner race 58 of a ball bearing assembly whose outer race 60 is mounted within a housing 61 disposed externally of and adjacent to the downstream end of the by-pass passage 51. The annular member 57 has an externally toothed portion 62, which meshes with a gear 63. The gear 63 is mounted on the shaft 64 of a motor 65.

The annular member 57 carries a plurality of angularly spaced apart valve obturating members 66. The valve obturating members 66 are spaced apart by angles which are substantially the same as the angles between the stub pipes 53.

The annular member 57 is provided with a plurality of angularly spaced apart apertures 67, an aperture 67 being provided between each adjacent pair of obturating members 66. The apertures 67 may be brought into and out of alignment with the passages 54.

Figure 6:
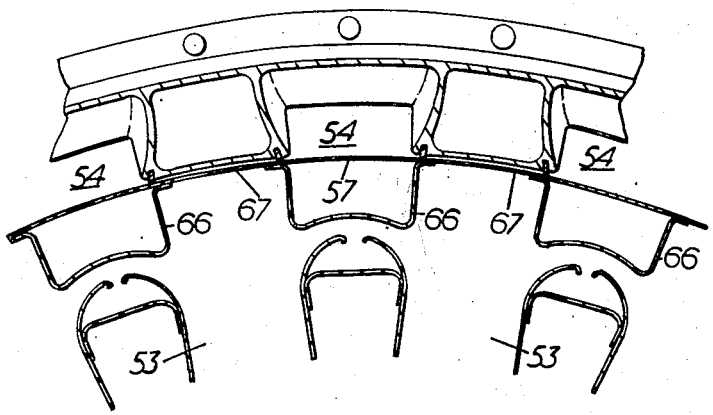
Figure 7:
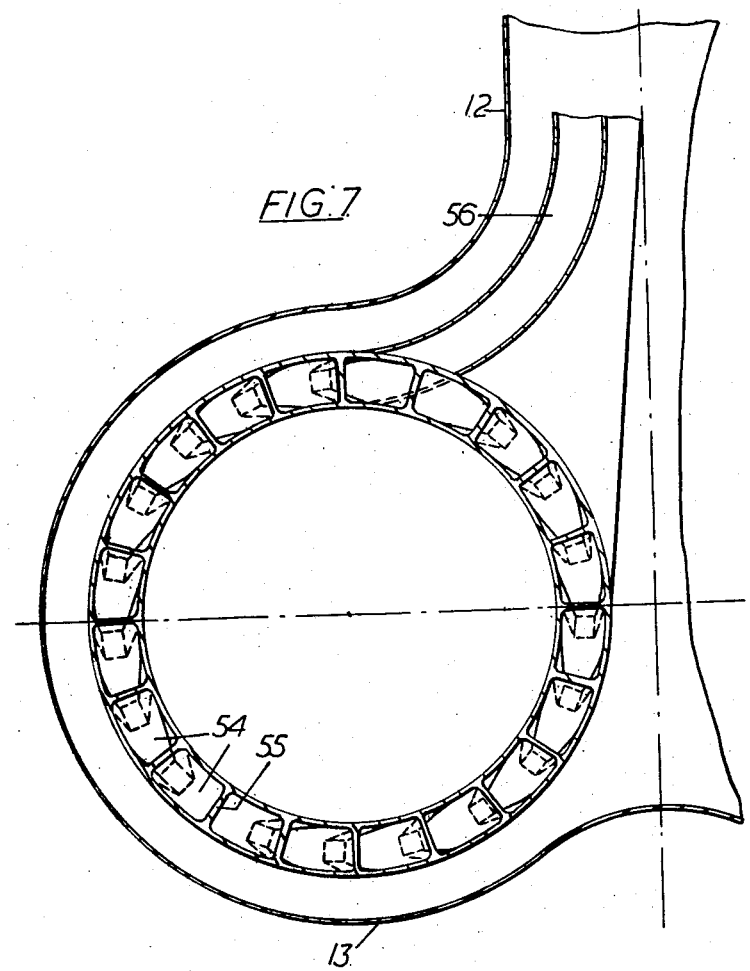

In the position of the parts shown in FIGURES 5 and 6, the apertures 67 are out of alignment with the passages 54 and no by-pass air is therefore supplied to the latter. In this position of the parts, the valve obturating members 66 permit the full flow of by-pass air from the by-pass passage 51 to be supplied to the stub pipes 53.

The annular member 57, may, however, be rotated by the motor 65 through, say, 9° and into a position (not shown) in which the apertures 67 are aligned with the passages 54 so that the latter are supplied with by-pass air. In this position of the parts, the obturating members 66 partially obstruct flow into the stub pipes 53 whereby the quantity of by-pass air supplied to the jet pipes 52 is reduced.

We claim:

1. A by-pass gas turbine engine comprising a jet pipe, a by-pass passage, mixing means arranged to deliver air from the by-pass passage to the jet pipe so as to mix with the jet gases therein, an ancillary air conduit which is adapted to be supplied with air from the by-pass passage, valve means disposed closely adjacent the point of admixture of the by-pass air and the jet gases for controlling communication between the by-pass passage and said mixing means and for controlling communication between the by-pass passage and the ancillary air conduit, and operating means for moving the said valve means between a first operational position in which the valve means blanks off the ancillary air conduit from the by-pass passage and fully opens the mixing means to the flow of air passing through the by-pass passage, and a second operational position in which the ancillary air conduit is opened to the by-pass passage while communication between said mixing means and the by-pass passage is only partially restricted whereby said valve means ensures that by-pass air is always mixed with said jet gases, said mixing means, said ancillary air conduit, and said valve means being so dimensioned that when said valve means is in said second operational position, the by-pass air flows through said mixing means and into the jet gases at substantially the same velocity as when said valve means is in said first operational position.

2. A by-pass gas turbine engine as claimed in claim 1 in which the valve mechanism comprises flap valves which are movable between a first operational position in which they block the ancillary air conduit, and a second operational position in which they block part of the said mixing means.

3. A by-pass gas turbine engine as claimed in claim 1 in which the valve mechanism comprises an annular member, a plurality of angularly spaced apart obturating members carried by said annular member, said annular member having apertures between each adjacent pair of obturating members, said mixing means and said ancillary air conduit each comprising a corresponding plurality of angularly spaced apart passages, the annular member being movable between a first operational position in which the apertures are out of alignment with the passages of the ancillary air conduit and the obturating members permit full flow through the mixing means, and a second operational position in which the apertures are aligned with the passages of the ancillary air conduit and the obturating members restrict flow through the mixing means.

4. A by-pass gas turbine engine comprising a jet pipe, a by-pass passage, mixing means arranged to deliver air from the by-pass passage to the jet pipe so as to mix with the jet gases therein, an ancillary air conduit which is adapted to be supplied with air from the by-pass passage, valve means disposed closely adjacent the point of admixture of the by-pass air and the jet gases for controlling communication between the by-pass passage and said mixing means and for controlling communication between the by-pass passage and the ancillary air conduit, operating means for moving the said valve means between a first operational position in which the valve means blanks off the ancillary air conduit from the by-pass passage but opens the mixing means to the full flow of air passing through the by-pass passage, and a second operational position in which the ancillary air conduit is opened to the by-pass passage while communication between said mixing means and the by-pass passage is only partially restricted whereby said valve means ensures that by-pass air is always mixed with said jet gases, said mixing means, said ancillary air conduit, and said valve means being so dimensioned that when said valve means is in said second operational position, the by-pass air flows through said mixing means and into the jet gases at substantially the same velocity as when said valve means is in said first operational position, a variable area propulsion nozzle at the downstream end of the jet pipe, and means operatively connected to said valve moving means for reducing the effective area of the variable area nozzle simultaneously with movement of the said valve mechanism to its said second operational position.

5. A by-pass gas turbine forward propulsion engine comprising a jet pipe, a jet deflector which is movable between an inoperative position and an operative position in which it deflects the jet gases downwardly, a by-pass passage, mixing means arranged to deliver air from the by-pass passage to the jet pipe so as to mix with the jet gases therein, an ancillary air conduit which is adapted to be supplied with air from the by-pass passage, valve means disposed closely adjacent the point of admixture of the by-pass air and the jet gases for controlling communication between the by-pass passage and said mixing means and for controlling communication between the by-pass passage and the ancillary air conduit, operating means for moving the said valve means between a first operational position in which the valve means blanks off the ancillary air conduit from the by-pass passage but opens the mixing means to the full flow of air passing through the by-pass passage, and a second operational position in which the ancillary air conduit is opened to the by-pass passage while communication between said mixing means and the by-pass passage is only partially restricted whereby said valve means ensures that by-pass air is always mixed with said jet gases, said mixing means, said ancillary air conduit, and said valve means being so dimensioned that when said valve means is in said second operational position, the by-pass air flows through said mixing means and into the jet gases at substantially the same velocity as when said valve means is in said first operational position, a variable area propulsion nozzle at the downstream end of the jet pipe, and means operatively connected to said valve moving means for reducing the effective area of the variable area nozzle simultaneously with movement of said valve mechanism to its said second operational position.

6. A by-pass gas turbine engine comprising a jet pipe, a by-pass passage, mixing means arranged to deliver air from the by-pass passage to the jet pipe so as to mix with the jet gases therein, an ancillary air conduit which is adapted to be supplied with air from the by-pass passage, valve means disposed closely adjacent the point of admixture of the by-pass air and the jet gases for controlling communication between the by-pass passage and said mixing means and for controlling communication between the by-pass passage and the ancillary air conduit, operating means for moving the said valve means between a first operational position in which the valve means blanks off the ancillary air conduit from the by-pass passage but opens the mixing means to the full flow of air passing through the by-pass passage, and a second operational position in which the ancillary air conduit is opened to the by-pass passage while communication between said mixing means and the by-pass passage is only partially restricted whereby said valve means ensures that by-pass air is always mixed with said jet gases, said mixing means, said ancillary air conduit, and said valve means being so dimensioned that when said valve means is in said second operational position, the by-pass air flows through said mixing means and into the jet gases at substantially the same velocity as when said valve means is in said first operational position, a pivotally mounted flap disposed at the downstream end of the jet pipe and constituting part of a variable area propulsion nozzle, a cam for effecting pivotal movement of the flap, and means for effecting simultaneous movement of said cam and said valve mechanism.

7. On an aircraft, a by-pass gas turbine engine comprising a by-pass passage, mixing means arranged to deliver air from the by-pass passage to the engine jet pipe so as to mix with the jet gases therein, an ancillary air conduit which is adapted to be supplied with air from the by-pass passage, valve means disposed closely adjacent the point of admixture of the by-pass air and the jet gases for controlling communication between the by-pass passage and said mixing means and for controlling communication between the by-pass passage and the ancillary air conduit, operating means for moving the said valve means between a first operational position in which the valve means blanks off the ancillary air conduit from the by-pass passage but opens the mixing means to the full flow of air passing through the by-pass passage, and a second operational position in which the ancillary air conduit is opened to the by-pass passage while communication between said mixing means and the by-pass passage is only partially restricted whereby said valve means ensures that by-pass air is always mixed with said jet gases, said mixing means, said ancillary air conduit, and said valve means being so dimensioned that when said valve means is in said second operational position, the by-pass air flows through said mixing means and into the jet gases at substantially the same velocity as when said valve means is in said first operational position, and attitude control nozzle means which are arranged at the front and rear of the fuselage of the aircraft and which are supplied with air from the ancillary air conduit.

8. A by-pass gas turbine engine as claimed in claim 3 in which said annular member is rotatably mounted about the axis of the engine and said obturating members are rigidly connected to said annular member.

9. A by-pass gas turbine engine having a jet nozzle, mixing means positioned up-stream of the discharge end of said jet nozzle for mixing by-pass air with jet gases prior to their exit through the jet nozzle, an ancillary air conduit for supplying air for ancillary purposes and valve means coacting with said mixing means and said ancillary air conduit and disposed closely adjacent the point of admixture of the by-pass air and the jet gases, said valve means having a first operational setting closing said ancillary air conduit and fully opening said mixing means to flow of by-pass air and a second operational setting fully opening said ancillary air conduit to flow of by-pass air and only partially closing said mixing means to flow of by-pass air whereby said valve means insures that said by-pass air is always mixed with said jet gases, said mixing means said ancillary air conduit and said valve means being so dimensioned that when said valve means is in said second operational setting, the by-pass air flows through said mixing means and into the jet gases at substantially the same velocity as when said valve means is in said first operational setting.

10. A by-pass gas turbine engine as claimed in claim 9 including a jet pipe, said mixing means comprising a plurality of short stub pipes projecting into the jet pipe and angularly spaced apart so that the jet gases flow between adjacent pairs of said stub pipes.

11. A by-pass gas turbine engine having a by-pass passage, a jet pipe, a jet nozzle at the downstream end of the jet pipe, a plurality of short stub pipes projecting into the jet pipe upstream of the jet nozzle and angularly spaced apart so that the jet gases in the jet pipe flow between adjacent pairs of said stub pipes, said stub pipes having outlet openings which open in the jet pipe and inlet openings, an ancillary air conduit for supplying air for ancillary purposes, and an annular valve member rotatably mounted about the axis of the engine and controlling communication between said by-pass passage and said stub pipes on the one hand and said ancillary air conduit on the other hand, said ancillary air conduit having a plurality of angularly spaced inlet apertures, and said valve member co-acting with said inlet apertures of the ancillary air conduit, and the inlet openings of the stub pipes, which inlet openings are located on an imaginary approximately cylindrical surface radially inwards of the valve member, whereby the valve member is disposed closely adjacent said outlet openings of the stub pipes, said valve member having a first operational setting closing said inlet apertures and fully opening said inlet openings to flow of by-pass air, and a second operational setting fully opening said inlet apertures to flow of by-pass air and only partially closing said inlet openings to flow of by-pass air, whereby said valve member ensures that said by-pass air is always mixed with said jet gas, said stub pipes, said ancillary air conduit and said valve member being so dimensioned that when said valve member is in said second operational setting, the by-pass air flows through said stub pipes and into the jet gases at substantially the same velocity as when said valve member is in said first operational setting.

References Cited in the file of this patent

UNITED STATES PATENTS

| | | |
|---|---|---|
| 2,527,732 | Imbert | Oct. 31, 1950 |
| 2,635,420 | Jonker | Apr. 21, 1953 |
| 2,831,627 | Brunner | Apr. 22, 1958 |
| 2,857,740 | Hall et al. | Oct. 28, 1958 |
| 2,870,978 | Griffith et al. | Jan. 27, 1959 |
| 2,873,576 | Lombard | Feb. 17, 1959 |
| 2,900,789 | Philpot | Aug. 25, 1959 |
| 2,930,185 | Tyler | Mar. 29, 1960 |
| 3,049,873 | Weeks | Aug. 21, 1962 |

FOREIGN PATENTS

| | | |
|---|---|---|
| 610,143 | Great Britain | Oct. 12, 1948 |